(12) United States Patent
Lundy et al.

(10) Patent No.: US 7,139,980 B1
(45) Date of Patent: Nov. 21, 2006

(54) METHOD AND SYSTEM FOR SELECTING AND SAVING OBJECTS IN WEB CONTENT

(75) Inventors: Michael Lundy, Olathe, KS (US); Benjamin P. Blinn, Overland Park, KS (US); Robert H. Miller, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 728 days.

(21) Appl. No.: 10/267,389

(22) Filed: Oct. 9, 2002

(51) Int. Cl.
*G06F 17/00* (2006.01)

(52) U.S. Cl. .................. 715/767; 715/802; 715/805; 715/760

(58) Field of Classification Search .............. 715/516, 715/526, 810, 760, 767, 739, 738, 735, 747, 715/802, 805
See application file for complete search history.

(56) References Cited

U.S. PATENT DOCUMENTS

| | | | | |
|---|---|---|---|---|
| 6,052,710 A | * | 4/2000 | Saliba et al. ............... | 709/203 |
| 6,317,141 B1 | * | 11/2001 | Pavley et al. ............... | 715/732 |
| 6,694,357 B1 | * | 2/2004 | Volnak ....................... | 709/218 |
| 6,931,600 B1 | * | 8/2005 | Pittman ...................... | 715/767 |
| 2001/0030660 A1 | * | 10/2001 | Zainoulline ................. | 345/720 |
| 2002/0035619 A1 | * | 3/2002 | Dougherty et al. ......... | 709/219 |
| 2002/0056123 A1 | * | 5/2002 | Liwerant et al. ............. | 725/87 |
| 2002/0161794 A1 | * | 10/2002 | Dutta et al. ................. | 707/500 |
| 2003/0004983 A1 | * | 1/2003 | Cohen ........................ | 707/500 |
| 2003/0018714 A1 | * | 1/2003 | Mikhailov et al. .......... | 709/203 |
| 2003/0079224 A1 | * | 4/2003 | Komar et al. ................ | 725/32 |
| 2004/0004636 A1 | * | 1/2004 | van Driel .................... | 345/760 |
| 2004/0148375 A1 | * | 7/2004 | Levett et al. ................ | 709/223 |

* cited by examiner

*Primary Examiner*—Tadesse Hailu

(57) ABSTRACT

A method and system for allowing a user to select and save non-focusable objects presented by a browser application. The non-focusable objects may be objects that the browser application does not allow the user to select and save. The browser application may present the non-focusable objects as a list of objects, rather than as the non-focusable objects. The user may select an object from the list of objects and save a file that defines the object. As a result, the user may select and save the objects presented by the browser application even though the objects were presented as non-focusable objects.

21 Claims, 7 Drawing Sheets

| Title | = | Functions |

| Choice 1 | = | "Play Ring Sound" |
| Object | = | Ring File |

| Choice 2 | = | "Go to Phone Book" |
| Object | = | Phone Book File |

| Object | = | "Trash Can File" |
| Object | = | "House File" |

FIG. 5

METHOD AND SYSTEM FOR SELECTING AND SAVING OBJECTS IN WEB CONTENT

BACKGROUND

1. Field of the Invention

The present invention relates to telecommunications services and more particularly to a method and system for selecting and saving objects, such as audio clips, video clips, and images, in web content.

2. Description of Related Art

Telecommunications technology offers people a number of ways to interact with each other. The client terminal is one of the more popular modes of communication. The client terminal may be a cellular telephone, pager, or personal digital assistant (PDA), for example, which a person may carry to readily communicate with others.

The client terminal may have a display screen and an input mechanism. For example, the display screen may be a liquid crystal display (LCD) or cathode ray tube (CRT). The input mechanism may include navigation keys and softkeys. The navigation keys allow for scrolling through a list of items on the display screen. And the softkeys allow for selecting one item from the list of items.

The client terminal typically has a browser application to facilitate connectivity with an Internet or an Intranet. The browser application may send signals to a server on the Internet or the Intranet so as to request that various functions be performed. Alternatively, the browser application may receive web content from the server, interpret the web content, and display the web content on the display screen of the client terminal.

Cards typically define the web content that the browser application receives from the server. The cards segment the web content into units that are easily presentable on the client terminal. The cards are encoded in a markup language such as wireless markup language (WML), handheld device markup language (HDML), or compact hyper-text markup language (cHTML). The markup language is a set of instructions that cause the browser application to display text and graphics, accept user input, and send the user input to the server.

The browser application typically presents focusable objects and non-focusable objects on the client terminal. Menu options are typically focusable objects. For example, the card may program the browser application to display a set of menu options on the display screen. Using the input mechanism, the user can select a menu option from the set of menu options. The browser application may then responsively perform a function associated with the menu option being selected, e.g., send an e-mail or an instant message.

On the other hand, a non-focusable object may be an object that the browser application does not allow the user to select. The browser application may present an audio clip, video clip, or an image as part of presenting a card on the client terminal, but not allow the user to select the audio clip, the video clip, or the image. Additionally, the browser application might not allow the user to save the audio clip, the video clip, or the image.

Thus, the browser application is programmed to allow the user to interact differently with focusable objects as compared to non-focusable objects.

SUMMARY

The present invention stems from an inability to select and save non-focusable objects in web content. The browser application presents non-focusable objects, e.g., audio clips, video clips, or images, on the client terminal, but does not allow the user to select or save those non-focusable objects.

In accordance with a principle aspect of the present invention, a browser application may present the user with a list of objects. The lists of objects may identify, as choice-items, non-focusable objects previously presented by the browser application on the client terminal. The browser application may allow the user to select any object from the list of objects and save the object that was previously presented as non-focusable.

The user might not be able to select and save all of the objects in the list of objects. Instead, the user may be able to select and save those objects that can be presented by the browser application by a separate application. If the browser application has access to the separate application, then the browser application may allow the user to select or save the object. If the browser application does not have access to the separate application, then the browser application will not allow the user to select or save the object.

For example, a sound application may be accessible to the browser application. The browser application may use the sound application to play audio clips on the client terminal. As a result, the browser application may allow for selecting an object in a form of an audio clip from the list of objects and saving a sound file defining the audio clip. In contrast, an imaging application might not be accessible to the browser application. The imaging application may present images on the client terminal. As a result, the browser application might not allow the user to select an object in a form of an image from the list of objects and save an image file defining the image.

A content manager may be a software entity that resides on the client terminal. Alternatively, the content manager may be a software entity that resides on a server communicatively coupled to the client terminal. The content manager may determine whether the browser application has access to the application for presenting the object on the client terminal. If the browser application has access to the application, then the browser application may indicate that the object is selectable and saveable. If the browser application does not have access to the application, then the browser application might not indicate that the object is selectable and saveable. In such a case, the user of the client terminal might not be able to select or save the file defining the object.

These as well as other aspects and advantages will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 5 illustrates exemplary markup language instructions that define the exemplary card of FIG. 4;

DETAILED DESCRIPTION OF EXEMPLARY EMBODIMENTS

Figure 1:
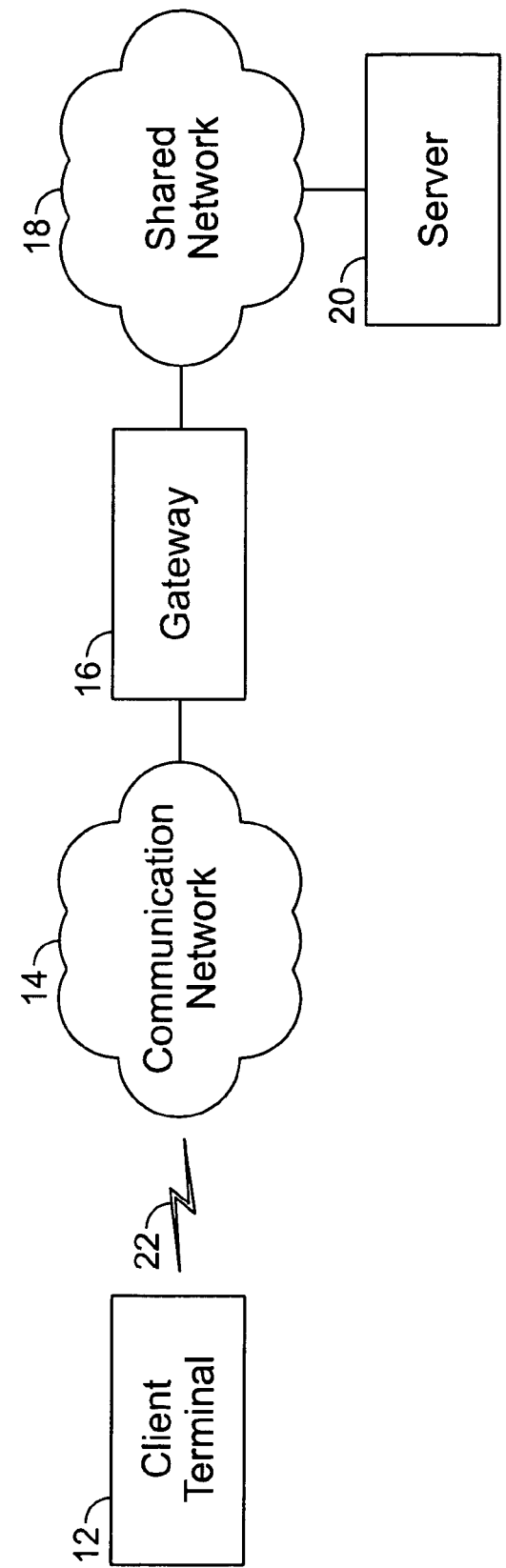
FIG. 1 illustrates an exemplary wireless network architecture in which a client terminal communicates with a server over an air interface.

Referring to the drawings, FIG. 1 illustrates an exemplary wireless network architecture in which exemplary embodiments of the present invention may be employed. Those skilled in the art will appreciate that other network architectures can be used instead, additional elements may be added to these network architectures, and some elements may be omitted altogether. Further, as in most telecommunications applications, those skilled in the art will appreciate that many of the elements described herein are functional entities that may be implemented as discrete components or in conjunction with other components, in any suitable combination and location. Still further, the various functions described herein may be carried out by hardware or by a processor programmed to execute computer instructions, e.g., software or firmware, stored in memory. Provided with the present disclosure, those skilled in the art can readily design the hardware or prepare the computer instructions necessary to perform the various functions.

Referring to FIG. 1, the network architecture is shown to include a client terminal 12 that communicates with a server 20. The client terminal 12 may be a wireless device such as a cellular telephone, a personal digital assistant (PDA), or a pager. Alternatively, the client terminal may be a landline terminal such as a telephone. The server 20 may be a shared computer capable of exchanging signals with multiple client terminals. Alternatively, the server 20 may be a collection of devices that together function as the shared computer. Other variations are also possible.

When the client terminal is a wireless device, an air interface 22, a communication network 14, a gateway 16, and a shared network 18 may carry the signals between the client terminal 12 and the server 20. The communication network 14 may facilitate an exchange of the signals with the client terminal 12 over the air interface 22. The communication network 14 may have a base station that defines a radiation pattern over the air interface 22. The base station may be additionally coupled to various network elements, e.g., a mobile switching center (MSC), an interworking function (IWF), and a packet switched data node (PDSN). The MSC and the IWF may collectively work to convert signals sent from the client terminal 12 into packets and route the packets to the gateway 16. Additionally, the MSC and the IWF may collectively work to convert the packets sent from the gateway 16 into signals to be sent to the client terminal 12. On the other hand, the PDSN may route packets between the client terminal 12 and the gateway 16.

The gateway 16 may couple the communication network 14 to the shared network 18. The gateway 16 may receive web content from the server 20 and convert the web content into a format understandable by the client terminal 12. For example, the gateway 16 may convert the web content in the form of web pages into the cards so that the client terminal 12 need not have to convert the web pages into the cards, itself. Of course, the gateway 16 may perform other functions in addition to, or instead of, those described herein.

The shared network 18 may be a network of computer networks. The server 20 may be coupled to the shared network 18, e.g., an Internet or Intranet, so that the server 20 can exchange the web content with the client terminal 12.

Figure 2:
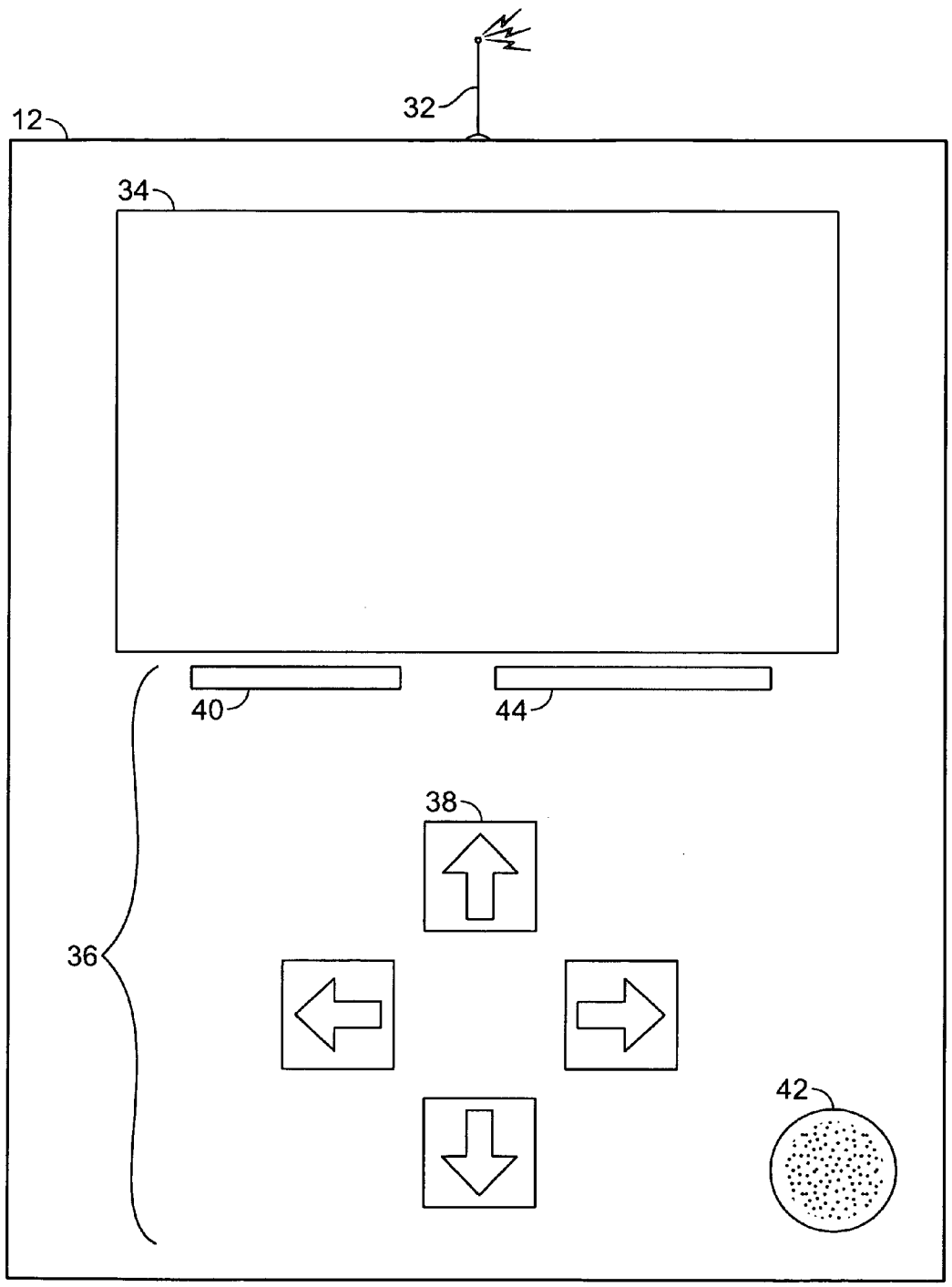
FIG. 2 illustrates an exemplary client terminal in a form of a wireless terminal.

FIG. 2 illustrates an exemplary embodiment of the client terminal 12. The client terminal 12 may be a processor-based device for sending web requests, e.g., hyper-text transfer protocol (HTTP) get requests, to the server 20 and receiving web content, e.g., cards, from the server 20. The client terminal 12 may have an antenna 32, a display screen 34, a speaker 42, and an input mechanism 36. The antenna 32 may allow for exchanging signals with the communication network 14 over the air interface 22. The signals may define web content that is received by the client terminal 12. The display screen 34 may be a liquid crystal display (LCD) or a cathode ray tube (CRT), for example, which displays text, images, and video defined by the web content. And the speaker 42 may generate audible sounds defined by the web content. Of course, the client terminal 12 may have other elements in addition to those described here.

The input mechanism 36 may allow the user to interact with the client terminal 12. For example, the client terminal may display a list on the display screen 34. The user may use navigation keys 38 to scroll through the list that is displayed on the display screen 34. And the client terminal 12 may have softkeys 40, 44. The user may press the softkeys 40, 44 to invoke a function to be performed by the client terminal 12, e.g., save an object as described herein, or select an item in the list.

Figure 3:
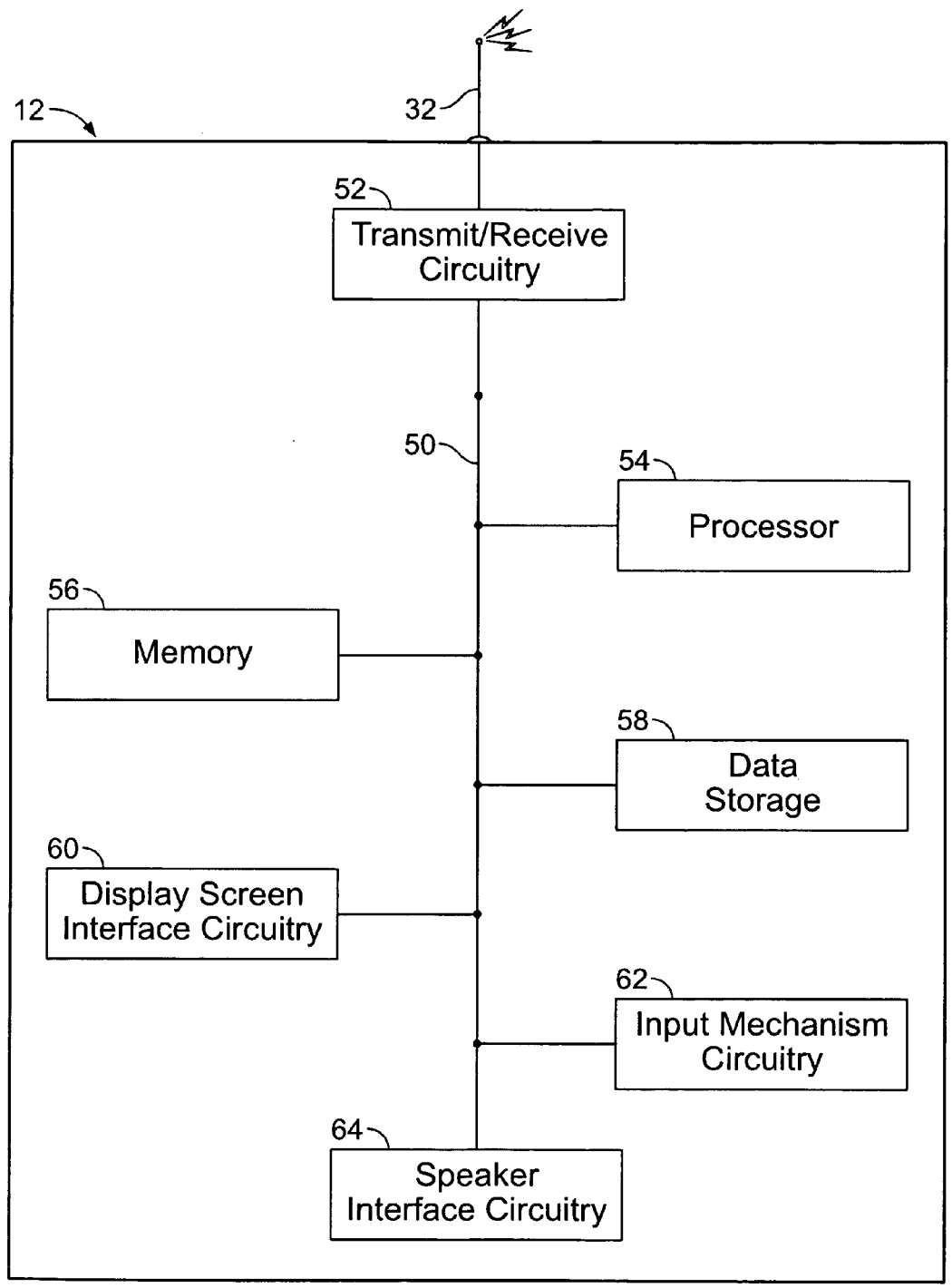
FIG. 3 illustrates an exemplary internal architecture of the wireless terminal.

FIG. 3 illustrates an exemplary internal architecture of the client terminal 12. The client terminal 12 may have a bus 50 on which a processor 54, memory 56, data storage 58, transmit/receive circuitry 52, display screen interface circuitry 60, speaker interface circuitry 64, and input mechanism circuitry 62 may be coupled. The processor 54 may be capable of executing computer instructions. The memory 56, e.g., random access memory, may be a temporary storage area for the computer instructions. On the other hand, the data storage 58 may be a more permanent storage area for the computer instructions. Of course, other variations are also possible.

The transmit/receive circuitry 52, display screen interface circuitry 60, input mechanism circuitry 62, and speaker interface circuitry 64, may allow for coupling the antenna 32, the display screen 34, the input mechanism 36, and the speaker 42, respectively, to the bus 50. The transmit/receive circuitry 52 may facilitate transmitting and receiving signals to/from the antenna 32. The display screen interface circuitry 60 may facilitate the display of the web content on the display screen 34. The speaker interface circuitry 64 may facilitate the playing of audible sound over the speaker 42. And the input mechanism circuitry 62 may allow for receiving input from the user via the input mechanism 36.

The client terminal 12 may receive from the server 20, web content in the form of cards. The cards may be defined by a set of markup language instructions that, for example, cause a browser application to display the web content on the display screen 34 or play the audible sound over the speaker 42. Additionally, the markup language instructions may cause the browser application to respond to actuation of the input mechanism 36. The markup language instructions may cause the browser application to perform other functions as well.

Although the client terminal 12 is described to receive web content in the form of cards, the web content may take other forms consistent with the exemplary embodiments of the present invention. For example, the web content may be defined by web pages or data files. Other arrangements are also possible.

Figure 4:
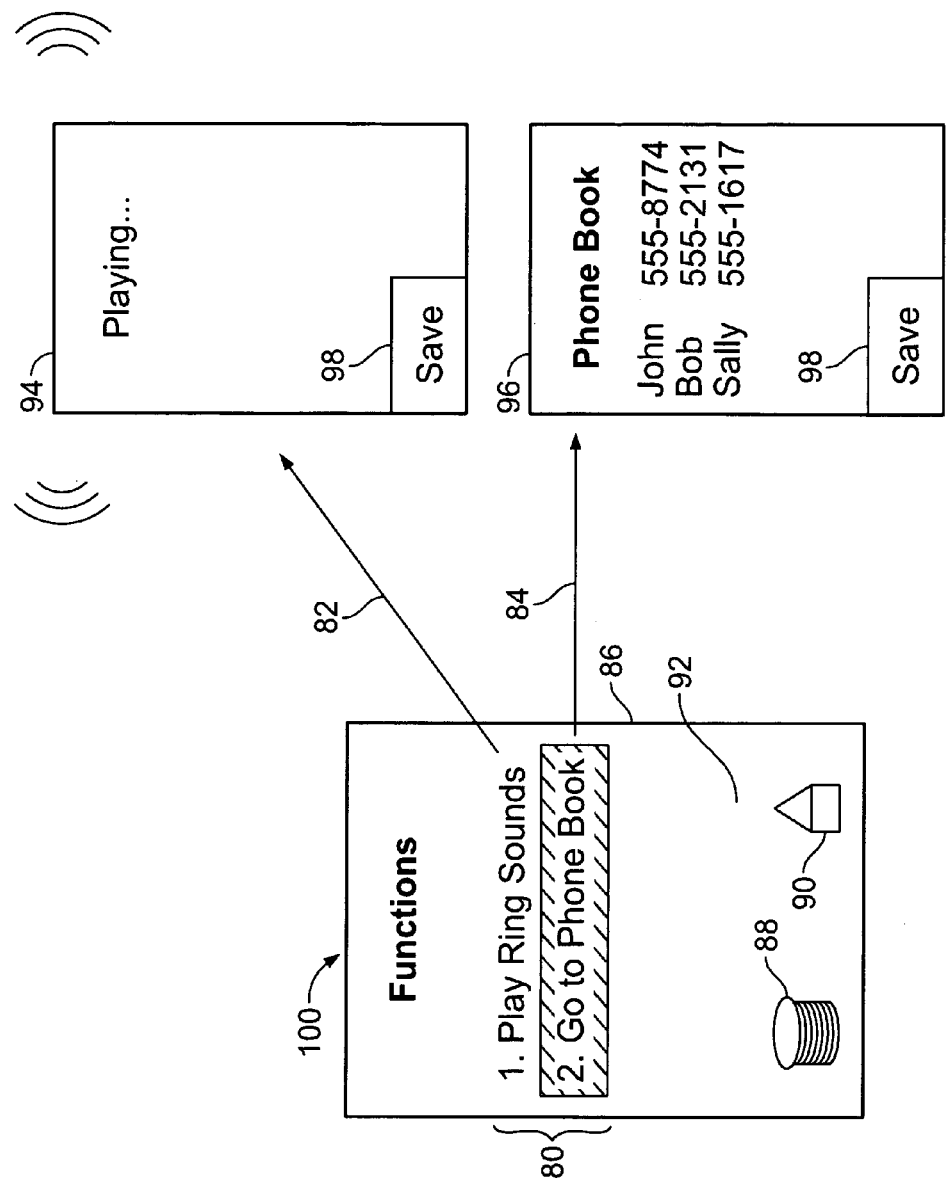
FIG. 4 illustrates an exemplary card that is displayed on a display screen of the client terminal.

FIG. 4 illustrates an exemplary card 100 that the client terminal 12 may receive from the server 20. The card 100 may define web content presentable on the client terminal 12. The web content may take a form of focusable objects, non-focusable objects, or a combination of both focusable objects and non-focusable objects.

A focusable object may be web content that is selectable by the user. For example, the browser application may present a card 100 on the client terminal 12. The card 100 may define a plurality of choice-items 80, including a PLAY RING SOUND choice item and a GO TO PHONEBOOK choice item. The browser application may allow the user to select a choice item from the plurality of choice items 80 to invoke a function, e.g., playing the ring sound 82 or displaying the phone book 84. The choice-item selected would constitute a focusable object.

Additionally, the browser application may also allow the user to save a ring file, which defines the ring sound, or save a phone book file, which defines the phone book. The ring file or the phone book file may be saved by pressing the soft key 40 below a "save" label 98 displayed on the display screen 34. By the browser application allowing the ring file and the phone book file to be saved by pressing the softkey 40 below the save label 98, the save label, the ring file, and the phone book file would constitute focusable objects.

On the other hand, a non-focusable object may be web content that the browser application does not allow the user to select. For example, the browser application may present an icon, e.g., an image, such as a trashcan 88 or a house 90 on the display screen 34. However, the browser application might not allow the user to select the image. Moreover, the browser application might not allow the user to save the image. Such an object would constitute a non-focusable object.

Of course, it should be appreciated that the card that is shown by FIG. 4 may take forms other than that illustrated. For example, the choice-items can vary from those described above and may, for instance, depend on factors such as: (i) the subject matter and (ii) the user's language. Again, since the server 20 usually has control over the cards sent to the browser application, the server 20 may customize the choice-items as desired. As another example, the choice-items can be displayed in another format, such as a drop-down list or as graphical icons.

FIG. 5 illustrates an exemplary set of markup language, which defines the card 100 of FIG. 4. The markup language may have various tags. For example, the card may have a "title" tag that identifies the title of the card. Additionally, the card may have a "choice" tag that identifies the choice-items of the card. Still additionally, the card may have "object" tags. The "object" tags may identify the audio clips, the video clips, and the images that define the card.

The browser application may use the choice tags and the object tags in the markup language, for example, to determine whether to present the web content as focusable objects or non-focusable objects. If the object tag, e.g., ring file or phone book file, is associated with a choice tag, then the object may be presented as a focusable object. If the object tag, e.g., trashcan file or house file, is not associated with a choice tag, then the object may be presented as a non-focusable object. Other arrangements are also possible when the markup language does not use tags, but rather uses some other indication of whether the object should be focusable or non-focusable.

According to an exemplary embodiment of the present invention, the client terminal 12 may be programmed with an application or function that the user can invoke to cause the client terminal 12 to display a list of the objects associated with a given card presented by the browser application 12. Advantageously, the list of objects may include both the focusable objects and the non-focusable objects. For example, the list of objects may identify audio clips, video clips, and images, which define the card, whether or not those objects are focusable. The application may then allow a user to select an object from the list of objects and direct the client terminal 12 to save the object. As a result, the user may beneficially save objects that define the card regardless of whether the objects are focusable or non-focusable.

Figure 6:
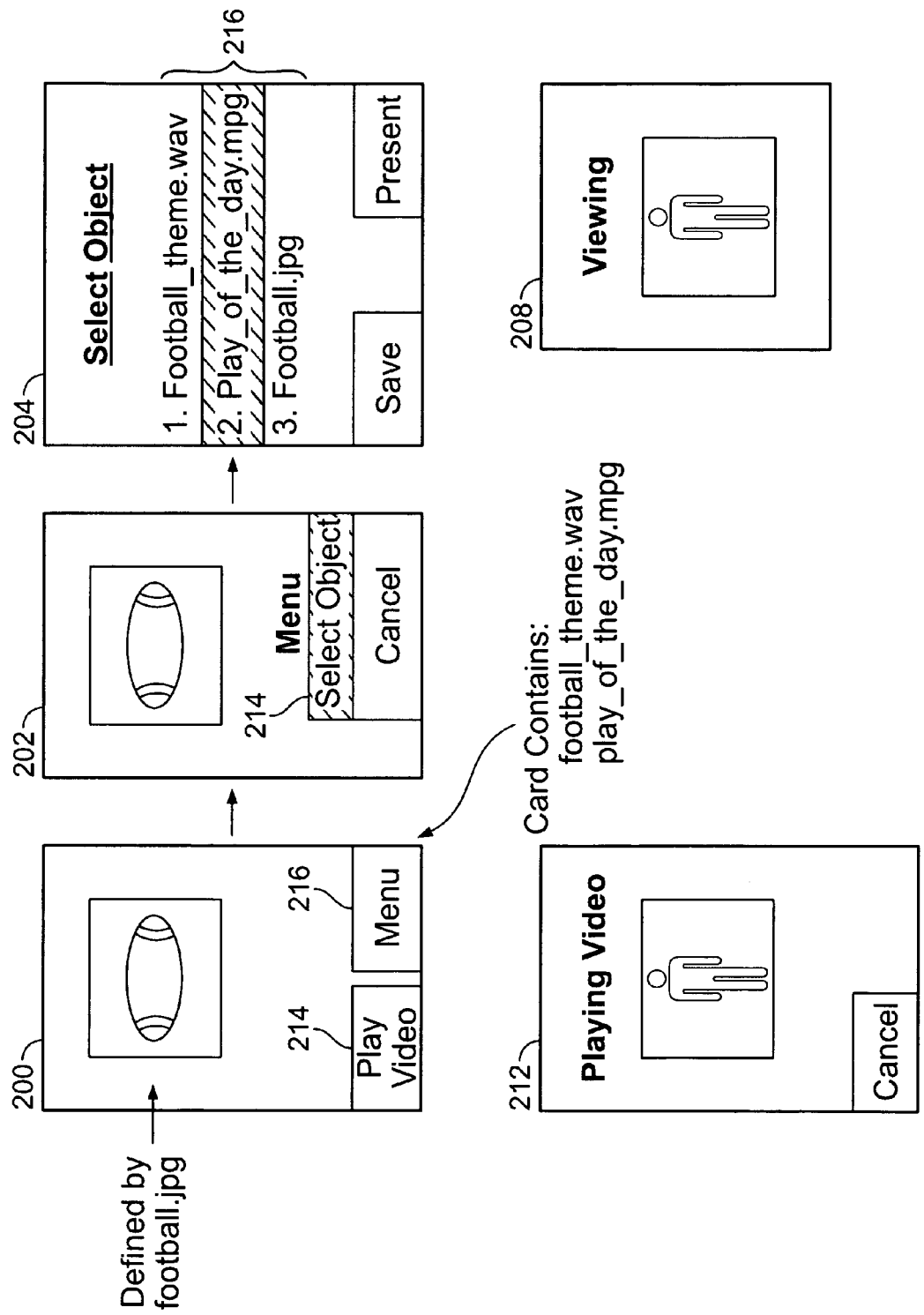
FIG. 6 is a screen flow that illustrates an exemplary process for selecting and saving objects within a card.

FIG. 6 illustrates an exemplary process for selecting and saving the non-focusable objects presented by the browser application on the display screen 34 of the client terminal 12.

The process for selecting and saving the focusable objects and/or the non-focusable objects may begin with the browser application displaying a card 200 on the display screen 34. The browser application may present the card 200 as focusable objects and non-focusable objects.

For example, the card 200 may have a focusable object 214, which allows for the user to play a video. The focusable object 214 may be defined by a video file, play_of_the_day.mpg. The video file may be included in the card 200 and, thus, reside on the client terminal 12. Alternatively, the video file may be received from the server 20 as a result of the focusable object 214 being selected.

The user may press a softkey 40, e.g., below with the play option 214, to play the video. As a result, the video defined by the video file may be presented on the client terminal 12. The video defined by the video file may be presented within another card 212, but other arrangements are also possible.

Additionally, the card 202 may have non-focusable objects. The non-focusable objects may include, for example, an image that is displayed on the client terminal 12. The image may be defined by an image file, such as football.jpg. Additionally, the card may include a non-focusable object in a form of an audio clip. The audio clip may be defined by a sound file, e.g., football_theme.wav. And the browser application may play the audio clip defined by the sound file when the card 200 is presented on the client terminal 12. Other arrangements are also possible.

In accordance with the exemplary embodiment of the present invention, the browser application may be programmed to allow the user to select the non-focusable objects and save the non-focusable objects in a data structure such as a file. For example, by pressing the softkey 44, e.g., below a menu option 216, the browser application may present a menu 214 on card 202. The menu may present a choice item "select object" that allows for user to select an object defined by the card 200.

As a result of the user indicating that an object is to be selected, e.g., by scrolling the choice item "select object" in the menu 214 under a highlight using the navigation keys 38, the browser application may present a list of objects 216. The list of objects 216, presented as a choice card 204, may identify the non-focusable objects in the card 200. The list of objects 216 may include the audio clips, the video clips, and the images of card 200, but other arrangements are also possible.

The browser application may allow the user to select an object from the list of objects. For example, the browser application may be programmed to allow the user to use the navigation keys 36 to scroll under a highlight an object in the list of objects and select the object by pressing a softkey 40.

The user may press the softkey 40 to designate that the object to be saved is under the highlight. In response to the user designating the object to be saved, the object may be saved in the data storage 58 or in the memory 56 as a data structure such as a file. The file may be received from the server 20 and saved on the client terminal 12. Alternatively, the file may be already resident on the client terminal, e.g., in cache. In response to the user designating the object to be saved, the object may be made more permanent. Other arrangements are also possible.

Additionally, the user may select the softkey 44 so that the browser application presents the object defined by the file on the client terminal 12. The browser application may present the object within a card 208. Other arrangements are also possible.

The browser application need not allow the user to select and save all of the non-focusable objects defined by the card 200. Instead, the browser application may allow the user to select and save certain objects in the list of objects. The user may be able to select and save those objects that the browser application can present on the client terminal 12. Those objects that browser application can present and thus allow to be selected and saved, may be designated by a marker, highlight, or reverse text, for example, or lack thereof. Other arrangements are also possible.

For example, if the object is an image and the file that defines the image is encoded using a Joint Motion Pictures Expert Group (JPEG) standard, then a content manager, to be described herein, may determine whether a JPEG decoder is accessible to the client terminal 12. The JPEG decoder may decode the file and allow the browser application to present the object defined by the file on the display screen 34. If the JPEG decoder is accessible, then the browser application may designate the object as selectable. If the JPEG decoder is not accessible, then the browser application will not designate the object as selectable.

Figure 7:
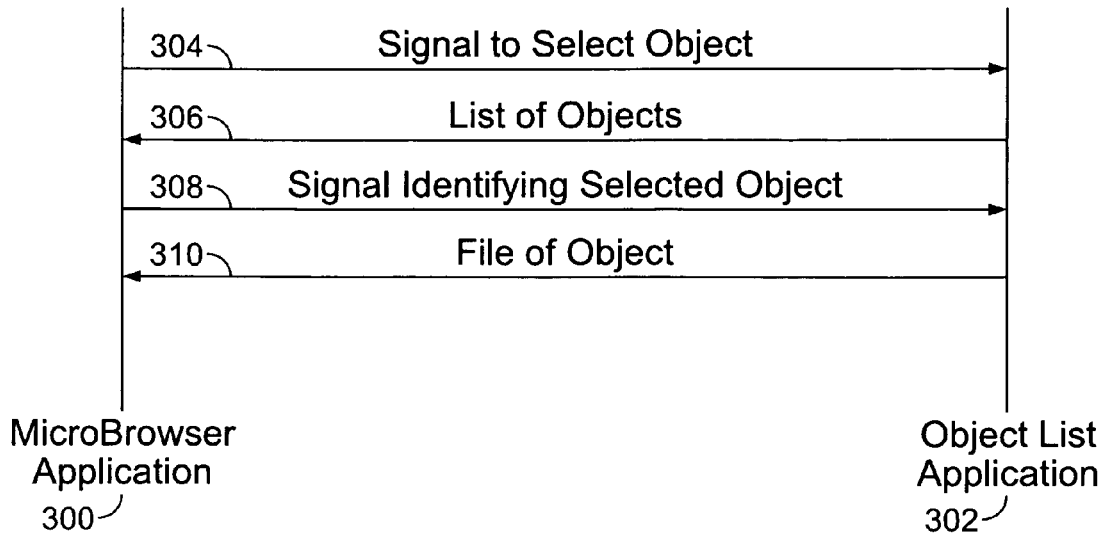
FIG. 7 is a call flow illustrating communications between the client terminal and the server as a result of a signal from a user to save an object from a list of objects.

FIG. 7 illustrates an exemplary call flow between a browser application 300 and an object list application 302 in accordance with an exemplary embodiment of the present invention. The exemplary embodiment may allow the user to select and save the non-focusable objects presented by the browser application 300. The object list application 302 may be a software entity resident on the server 20, the client terminal 12, or a combination of both. The object list application 302 may facilitate selecting and saving the non-focusable objects presented by the browser application 300. Other variations are also possible.

The user may invoke a function to select and save an object presented by the browser application 300. For example, the user may select a choice-item from a set of choice-items to invoke the function. Alternatively, the user may press the softkey 40, 44 to invoke the function.

At step 304, the browser application 300 may send a signal to the object list. The signal may indicate to the object list application 302 that an object presented by the browser application 300 is to be selected. The signal may have a request code that instructs the object list application 302 to send a list of objects to the browser application 300, thus, identifying the non-focusable objects presented by the browser application 300. Additionally, the signal may have a card code. The card code may identify a card for which a list of objects is requested. The card may be that which was previously presented by the browser application 300.

Alternatively, instead of sending to the object list application 302 the card code that identifies the card, the browser application 302 may send the card, itself. The signal may define the card that is sent to the object list application 302. Other arrangements are also possible.

The object list application 302 may receive from the browser application 300 the signal to send the list of objects. The object list application 302 may use the request code to identify that the signal is the request to send the list of objects. The object list application 302 may use the card code to identify the card for which the list of objects is requested. Alternatively, the object list application 302 may extract the card from the signal.

The object list application 302 may then generate a list of objects for the card. The object list application 302 may parse through the markup language of the card to identify the objects in the card. For example, the server 20 may identify tags in the markup language that identify the objects within the card. For example, the objects in the card may be defined by the tag "object=", as shown by FIG. 5. Along with the tag may be a file or other type of data structure that defines the object. Additionally, the markup language may have a description of the object, e.g., an "alt" value.

The object list application 302 may construct a list of the objects. The object list application 302 may, for example, encode, as choice items, names of the files or icons identifying or describing the objects. Then, the object list application 302 may send a card having the list of objects to the browser application 300 at step 306.

Alternatively, instead of the object list application 302 parsing through the card and identifying the objects within the card, the client terminal 12 may already have a card stored in memory. The card stored in memory may be a choice card that defines the list of objects for the card identified in the signal. The object list application 302 may retrieve the card stored in memory and send the card stored in memory to the browser application 300 at step 306. Other variations are also possible.

The browser application 300 may present the card defining the list of objects on the display screen 34 of the client terminal 12. If the list of objects is encoded as choice-items in a choice card, then the user may select a choice-item in the list of choice-items to indicate the object to be saved.

In response to the user selecting a choice-item, at step 308 the browser application 300 may send a signal to the object list application 302. The signal may identify to the object list application 302 which choice-item, i.e., object, was selected by the user. The signal, for example, may have a unique code that identifies the choice-item and thus the object that was selected. At step 310, the object list application 302 may send a data structure, such as a file, to the browser application 300. The file may have computer instructions or data that defines the object selected. The browser application 300 may receive the file and additionally save the file in the memory 56 or in the data storage 58. Additionally, in response to the user indicating selection of a choice-item or pressing a softkey 40, 44, the browser application 30 may present the object defined by the file on the client terminal 12.

Figure 8:
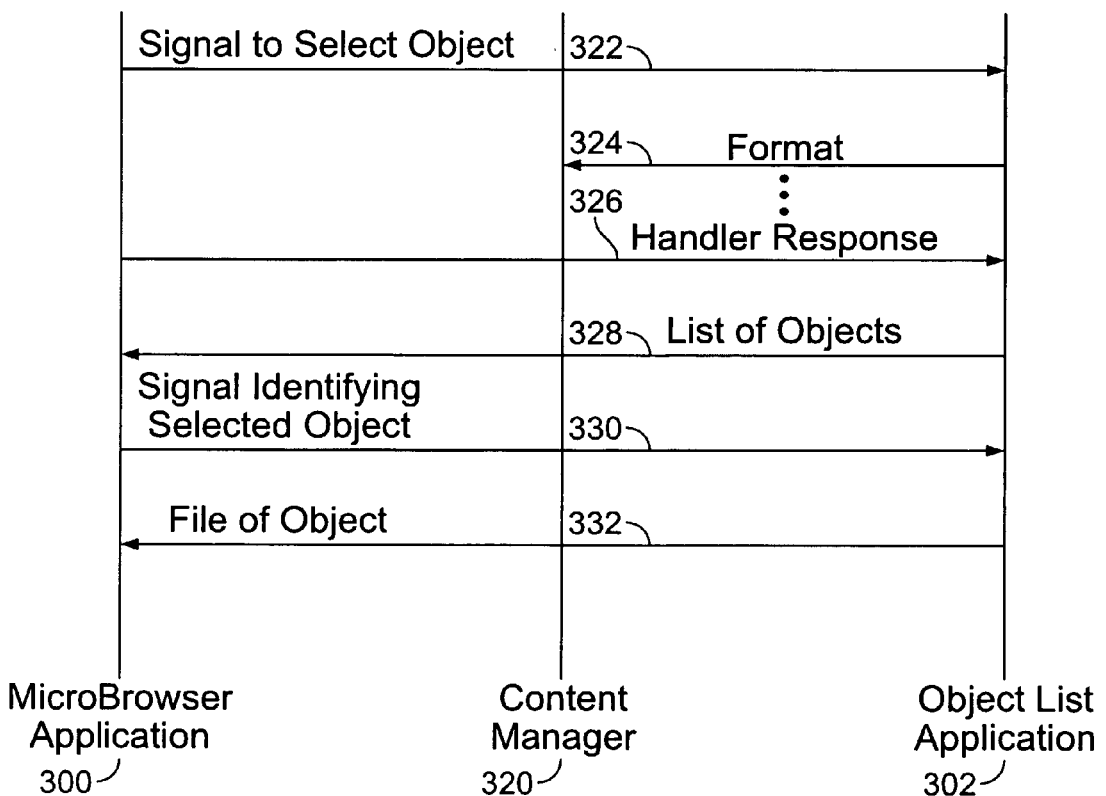
FIG. 8 is an alternative call flow illustrating communications between the client terminal and the server as a result of a signal from the user to save an object from a list of objects.

FIG. 8 illustrates an alternative exemplary call flow for an exemplary embodiment of the present invention. The alternative exemplary call flow may also allow the user to select and save the non-focusable objects defining a card.

According to the alternative exemplary call flow, the object list application 302 may determine what applications are accessible to the client terminal 12. The object list application 302 may exchange signals with a content manager 320 and tailor the list of objects according to the applications accessible to the client terminal 12.

The content manager 320 may be a software entity resident on the client terminal 12, the server 20, or another network entity. The content manager 320 may keep track of the applications that are accessible to the client terminal 12. The applications may be resident on the client terminal 12 or accessible to the client terminal 12 via the communication network 14. Other variations are also possible.

According to the alternative exemplary embodiment, at step 322, the browser application 300 may send a signal to the object list application 302. The signal may indicate to the object list application 302 that an object presented by the browser application 300 is to be selected. The signal may define a request code that indicates to the object list application 302 that a list of objects should be sent to the browser application 300. Additionally, the signal may identity the card for which the list of objects is requested. Alternatively, the signal, itself, may define the card for which the list of objects is requested.

The object list application 302 may identify the objects within the card. Each of the objects may be defined by a data structure such as a file. Additionally, the objects may be encoded in the file according to a particular format. For example, an object that is an image may be encoded in a file according to an image format such as JPEG. Alternatively, a video clip may be encoded in a file according to a video format such as Motion Pictures Expert Group (MPEG). Still alternatively, an object which is an audio clip may be encoded as a Microsoft wave file. Other arrangements are also possible depending on the type of object and the type of file defining the object.

A file name may identify the format of the file, e.g., an image format or a video format. For instance, the file name may have a ".jpg" suffix which identifies the format of the file as JPEG. Alternatively, the file name may have an ".mpg" suffix which identifies the format of the file as MPEG. Still alternatively, the format may be defined within the file. A header at the beginning of the file, for example, may have a code that identifies the format of the file.

The browser application 300 may have access to an application for decoding the object defined by the file. The application may decode the file so that the browser application 300 can present the object on the client terminal 12. For example, a JPEG decoder application may be accessible to the browser application 300. The JPEG decoder application 300 may decode a file encoded in JPEG so that the browser application can present the image on the display screen 34. Likewise, an MPEG decoder application may be accessible to the browser application 300. The MPEG decoder application may decode a file encoded in MPEG so that the browser application 300 can present the video clip on the display screen 34.

The object list application 302 may exchange signals with the content manager 320 so as to construct the list of objects that is to be sent to the browser application 300. The content manager 320 may determine whether the client terminal 12 has access to the application for decoding the file that defines an object.

For example, at step 324, the object list application 302 may send the format of the file that defines the object, e.g., MPEG format, JPEG format, Microsoft wave file. The content manager 320 may search a database to determine whether the client terminal has access to the application that can decode the file. At step 326, the content manager 320 may responsively send a handler response to the object list application 302. The handler response may indicate whether the client terminal 12 has access to the application.

If the content manager 320 indicates that the client terminal 12 has access to the application, then the object list application 324 may designate that the object in the list of objects is selectable. For example, the object list application 302 may designate that the object is selectable by a marker, highlight, reverse text, or lack thereof. If the client terminal 12 does not have access to the application, then the object list application 302 may designate that object is not selectable by another marker, highlight, reverse text, or lack thereof. Alternatively, the object list application 302 may not include the object in the list of objects. As a result, the user of the client terminal 12 cannot select the object because the object is not in the list of objects.

At step 328, the object list application 302 may send a card having the list of objects to the client terminal 12. The browser application 300 may present the card on the display screen 34 of the client terminal 12. At step 330, the browser application 300 may send a signal to the object list application 302. The signal may identify which object is selected from the list of objects. In response to receiving the signal, the object list manager may send a data structure, e.g., a file, to the browser application 300. The browser application 300 may send the file at step 332. The browser application 300 may receive the file and additionally save the file in the data storage. Additionally or alternatively, the browser application 300 may use the application associated with the file to present the object defined by the file on the client terminal 12.

Exemplary embodiments of the present invention have thus been illustrated and described. It will be understood, however, that changes and modifications may be made to the invention as described without deviating from the spirit and scope of the invention, as defined by the following claims.

We claim:

1. In a terminal of a type comprising a processor, a browser application, and an input mechanism, the browser application being executable by the processor and the input mechanism being operable to select focusable objects presented by the browser application, but inoperable to select non-focusable objects presented by the browser application, a method comprising:
   receiving web content;
   receiving a first signal to present a list of objects, the list of objects having as choice-items that include the non-focusable objets presented by the browser application;
   responsive to the first signal, presenting the list of objects on a display screen of the terminal;
   receiving a second signal which indicates selection of a choice-item; and
   responsive to the second signal, saving a designated non-focusable object, the designated non-focusable object being identified by the selection of the choice-item.

2. The method of claim 1, wherein saving the designated non-focusable object comprises (i) requesting from an object list application at least one file defining the designated non-focusable object; (ii) receiving from the object list application the at least one file; and (iii) saving in memory the at least one file defining the designated non-focusable object.

3. The method of claim 1, wherein each of the non-focusable objects is selected from the group consisting of an audio clip, a video clip, and an image.

4. The method of claim 1, further comprising displaying a menu on the display screen, the menu having a plurality of menu options, the plurality of menu options including a first option for presenting the list of objects on the terminal and a second option for saving the designated non-focusable object.

5. The method of claim 1, wherein presenting the list of objects comprises:
   making a determination of whether the terminal can present a given non-focusable object;
   based on the determination that the terminal can present the given non-focusable object, then designating in the list of objects that the given non-focusable object is selectable.

6. The method of claim 1, wherein presenting the list of objects comprises:
   making a determination of whether the terminal can present a given non-focusable object;
   based on the determination that the terminal can present the given non-focusable object, then designating in the list of objects that the given non-focusable object is selectable;
   based on the determination that the terminal cannot present the given non-focusable object, then not designating in the list of objects that the given non-focusable object is selectable.

7. The method of claim 1, wherein the terminal is a wireless terminal.

8. A method for a terminal to allow for selection of non-focusable objects presented by a browser application, the terminal having an input mechanism operable to select focusable objects presented by the browser application, but inoperable to select the non-focusable objects presented by the browser application, the method comprising:
   receiving a first signal from the terminal, the first signal being a request by the terminal to identify, as choice-items, the non-focusable objects presented by the browser application;
   responsive to the first signal, parsing the web content to identify the non-focusable objects presented by the browser application;
   sending to the terminal a list of objects comprising choice-items, the choice-items identifying the non-focusable objects presented by the browser application;
   receiving a second signal from the terminal, the second signal being another request by the terminal, the another request being to save a designated non-focusable object in the list of objects; and
   responsive to the second signal, sending to the terminal a data structure defining the designated non-focusable object.

9. The method of claim 8, wherein sending to the terminal the list of objects comprises:
   making a determination of whether the terminal can present an object of the list of objects; and
   based on the determination that the terminal can present the object of the list of objects, then designating in the list of objects that the object is saveable.

10. The method of claim 8, wherein sending to the terminal the list of objects that identifies the non-focusable objects comprises:
    making a determination of whether the terminal can present an object of the non-focusable objects;
    based on the determination that the terminal can present the object of the non-focusable objects, then including the object in the list of objects; and
    based on the determination that the terminal cannot present the object of the non-focusable objects, then not including the object in the list of objects.

11. The method of claim 8, wherein the data structure defining the designated non-focusable object is a file.

12. A system comprising:
    a processor;
    memory;
    a display screen;
    computer instructions stored in the memory and executable by the processor for performing the functions of:
       (i) receiving web content;
       (ii) receiving a first signal to present a list of objects, the list of objects having choice-items, the choice-items identifying non-focusable objects presented by a browser application;
       (iii) responsive to the first signal, presenting the list of objects on the display screen of the terminal;
       (iv) receiving a second signal indicating selection of a choice-item from the list of objects; and
       (v) responsive to the second user-indication, saving a designated non-focusable object, the designated non-focusable object being identified by the selection of the choice-item.

13. The system of claim 12, wherein the computer instructions stored in the memory and executable by the processor for performing the function of saving the designated non-focusable object comprises:
    sending to an object list application a signal to request at least one file defining the designated non-focusable object;
    responsive to the signal, receiving from the object list application the at least one file defining the designated non-focusable object; and
    saving the at least one file in the memory.

14. The system of claim 12, wherein the list of objects is constructed by an object list application, the object list application comprising computer instructions stored in memory and executable by a processor for performing the functions of:
    making a determination of whether the terminal can present a given non-focusable object;
    based on the determination that the terminal can present the given non-focusable object, then designating in the list of objects that the given non-focusable object is saveable.

15. The system of claim 12, wherein the list of objects is constructed by an object list application, the object list application comprising computer instructions stored in memory and executable by a processor for performing the functions of:
    making a determination of whether the terminal has an application to present a given non-focusable object;
    based on the determination that the terminal has the application to present the given non-focusable object, then including the object in the list of objects; and
    based on the determination that the terminal does not have the application to present the given non-focusable object, then not including the object in the list of objects.

16. The system of claim 12, wherein the list of objects is defined by a choice card.

17. A system for a terminal to select non-focusable objects in web content, the terminal having an input mechanism operable to select focusable objects defined by the web content but inoperable to select the non-focusable objects defined by the web content, the system comprising:
    a processor;
    memory; and computer instructions stored in the memory and executable by the processor for performing the functions of:

receiving a first signal from the terminal, the first signal being a request by the terminal to identify, as choice-items, the non-focusable objects presented by the browser application;

responsive to the first signal, parsing the web content to determine the non-focusable objects presented by the browser application;

sending to the terminal a list of objects having choice-items, the choice-items identifying the non-focusable objects presented by the browser application;

receiving a second signal from the terminal, the second signal being another request by the terminal, the another request being to save a designated non-focusable object in the list of objects; and responsive to the second signal, sending to the terminal the designated non-focusable object.

18. The system of claim 17, wherein the computer instructions stored in the memory and executable by the processor for performing the function of sending to the terminal the list of objects comprises:

making a determination of whether the terminal can present on the terminal an object in the list of objects; and based on the determination that the terminal can present on the terminal the object in the list of objects, then designating in the list of objects that the object is saveable.

19. The system of claim 17, wherein the computer instructions stored in the memory and executable by the processor for performing the function of sending to the terminal the list of objects that identifies the non-focusable objects comprises:

making a determination of whether the terminal can present an object of the non-focusable objects;

based on the determination that the terminal can present the object of the non-focusable objects, then including the object in the list of objects; and based on the determination that the terminal cannot present the object of the non-focusable objects, then not including the object in the list of objects.

20. The system of claim 17, wherein the computer instructions stored in the memory and executable by the processor for performing the function of sending to the terminal the designated non-focusable object comprises sending to the terminal at least one file defining the designated non-focusable object.

21. The system of claim 17, wherein the list of objects is defined by a choice card.

* * * * *